*Letellier & White,*
*Grain Meter.*
No. 89,153. Patented Apr. 20, 1869.
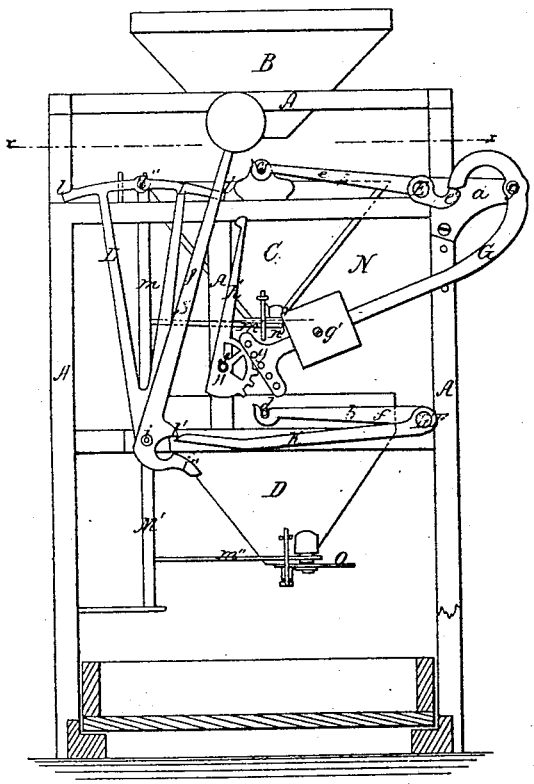
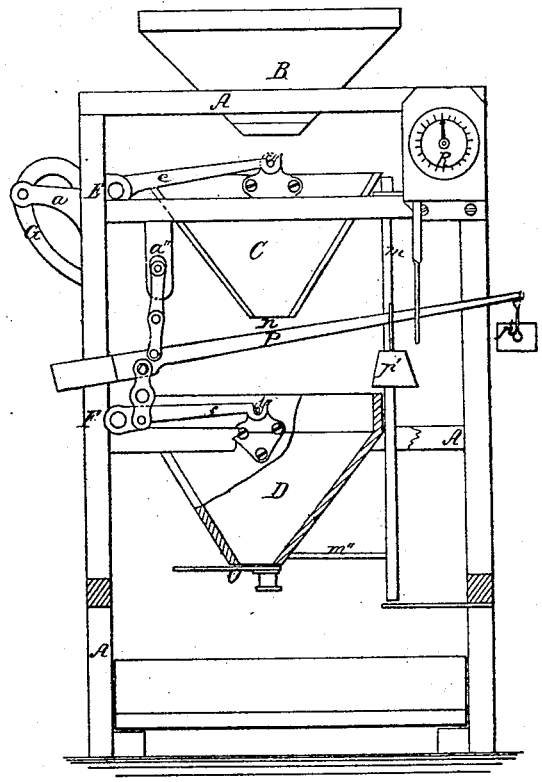
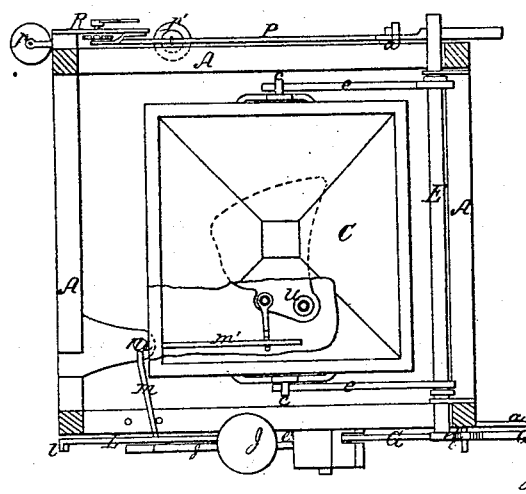
Witnesses:
Wm A Morgan
G. C. Cotton
Inventors:
John C. Letellier
F. White
per Munn & Co.
Attorneys
N. PETERS, PHOTO-LITHOGRAPHER, WASHINGTON, D.C.

UNITED STATES PATENT OFFICE.

JOHN G. LETTELIER AND F. WHITE, OF BLOOMINGTON, ILLINOIS.

IMPROVEMENT IN AUTOMATIC WEIGHING-MACHINE.

Specification forming part of Letters Patent No. 89,153, dated April 20, 1869.

*To all whom it may concern:*

Be it known that we, JOHN G. LETTELIER and F. WHITE, of Bloomington, in the county of McLean and State of Illinois, have invented a new and Improved Weighing-Machine; and do hereby declare that the following is a full, clear, and exact description thereof, reference being had to the accompanying drawing, making a part of this specification, in which—

Figure 1 represents a side elevation, with a part of the frame broken away. Fig. 2 represents an opposite side elevation, also with a part of the frame removed. Fig. 3 represents a horizontal section of Fig. 1 on the line $x\ x$, and also a broken section of the same on the line $z\ z$.

Letters of like name and kind refer to like parts in each of the figures.

Our invention relates to a class of devices for weighing grain, flour, and other articles automatically as the same are being run through spouts or discharged from elevators; and it consists in a receiving and a weighing hopper, arranged in a suitable frame upon vibrating supports, in a manner to actuate the necessary apparatus for opening and closing the gates at the bottom of the hoppers by the vibration of the said hoppers, caused by the weight of the charges, and by weighted levers when the hoppers are discharged, as will be more fully described below.

In the annexed drawing, A represents a frame, upon which the hoppers and the operating devices are arranged. B represents a bin, provided with a gate at its bottom for supplying grain to the receiving-hopper C, situated directly underneath. D represents the weighing-hopper, suspended beneath the receiving-hopper C, from which it is supplied with grain.

Both of the hoppers are suspended on trunnions $c\ c$ and $d\ d$, resting in bearings in the ends of the arms $e\ e$ and $f\ f$, projecting from the shafts E and F, which also rest in suitable bearings at one side of the frame. Secured to the end of the shaft E is a wiper, $e'$, projecting outward from the opposite side, but in a line with the arm $e$, and arranged so as to act against the end of a curved lever, G, which is pivoted at $g$ to a bracket, $a$, secured to and extending backward from the frame A.

The lever G is curved downward and forward, and has upon its end a rack, $g$, which meshes into and actuates a segmental gear, H, pivoted to the frame at $h$, and provided with an arm, $h'$, extending upward. A weight, $g'$, is so secured upon the lever G as to permit its adjustment forward or back, for the purpose of balancing the receiving-hopper C and such weight of grain as may be desired.

I represents a weighted lever, supported upon an axis at $i$, and provided with the wipers $i'$ and $i''$. K represents an arm, secured to the end of the shaft F, and arranged to act at its outer end in connection with the wipers $i'$ and $i''$ of the weighted lever I. L represents a segmental arm, pivoted loosely in the rear of and upon the same axis as the weighted lever I, and provided with two lugs, $l\ l'$, projecting forward at each end of its arc. M represents a vertical shaft, supported in suitable bearings, and provided with three arms, $m\ m'\ m''$, projecting horizontally therefrom, the first of which, $m$, is pivoted to the segmental arm L at $l''$, while the others, $m'$ and $m''$, are connected with the edgewise-swinging gates N and O, situated beneath the hoppers C and D. P represents a scale-beam, suspended from a bracket, $a''$, and connected with an arm, $f'$, secured to the shaft F. Said scale-beam is provided with the usual adjustable weights $p$ and $p'$, suspended from its outer end, and sliding upon the beam, by means of which the weight of the weighing-hopper D and of the desired amount of grain is balanced.

The operation of this device is as follows, viz: As shown in Fig. 1, the hoppers are empty, and the gate of the receiving-hopper N is closed, while that of the weighing-hopper O is opened. If, now, the grain is permitted to flow from the bin B into the hopper C, as soon as a sufficient quantity has entered its weight depresses said hopper and actuates the shaft E, and through it the curved lever G and segmental gear and arm H and $h'$, the latter of which, bearing against the weighted lever I, will press it over until beyond a perpendicular line, when it will fall against the lug $l$ of the segmental arm L, carrying the latter forward, and, by means of the vertical shaft M and arms $m\ m'\ m''$, close the gate of the weighing-hopper D and open that of the receiving-hopper C, allowing the contents of the latter to flow into the former. The grain from the bin continues to flow, falling through the open gate of the upper hopper until the contents of the lower hopper are of sufficient weight to depress said hopper, actuating the shaft F, and causing the arm $k$, bearing upon the wiper $i''$ of the weighted lever I, to press with sufficient force upon said wiper to raise said lever until it shall pass the perpendicular line and fall upon the opposite side, as shown in Fig. 1, striking against the lug $l'$ with sufficient force to move the segmental arm L in the same direction, and, by means of the vertical shaft M and its arms, change the position of the gates, so as to allow the charge in the lower hopper to flow out, while the upper or receiving hopper is being filled. These operations of alternately filling and discharging the hoppers will continue automatically as long as the supply of grain is continued.

A register, R, to indicate the number of hoppers weighed, may be actuated by the scale-beam, or by any other suitable vibrating arm.

Having thus fully set forth the nature and merits of our invention, what we claim as new, and desire to secure by Letters Patent, is—

1. The weighted lever I, provided with the wipers $i'$ and $i''$, and the segmental arm L, provided with the lugs $l$ and $l'$, or their equivalents, in combination with the arm K, substantially as and for the purpose set forth.

2. Also, the combination of the weighted lever I, the segmental arm L, and the vertical rock-shaft M, for actuating the gates N and O, with the hoppers C and D, or with either separately, substantially as shown and described.

3. Also, the within-described automatic weighing-machine, consisting of the hoppers C and D, suspended by trunnions upon the arms $e\ e$ and $f\ f$ of the shafts E and F, and provided with gates N and O, wiper $e'$, curved lever G, rack $g$, and weight $g'$, segmental gear H, and arm $h'$, weighted lever I, and wipers $i'$ and $i''$, arm K, segmental arm L, and lugs $l$ and $l'$, vertical shaft M, with its arms $m, m'$, and $m''$, and scale-beam P, all arranged to operate substantially as and for the purpose herein shown and described.

J. G. LETTELIER.
F. WHITE.

Witnesses:
J. F. RANDOLPH,
GEORGE BULL.